United States Patent
Miyoshi et al.

(10) Patent No.: US 6,847,828 B2
(45) Date of Patent: Jan. 25, 2005

(54) BASE STATION APPARATUS AND RADIO COMMUNICATION METHOD

(75) Inventors: Kenichi Miyoshi, Yokohama (JP); Takahisa Aoyama, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 396 days.

(21) Appl. No.: 10/069,484

(22) PCT Filed: Jul. 2, 2001

(86) PCT No.: PCT/JP01/05694

§ 371 (c)(1),
(2), (4) Date: Feb. 27, 2002

(87) PCT Pub. No.: WO02/03573

PCT Pub. Date: Jan. 10, 2002

(65) Prior Publication Data

US 2002/0123351 A1 Sep. 5, 2002

(30) Foreign Application Priority Data

Jul. 3, 2000 (JP) .................................. 2000-201232

(51) Int. Cl.[7] ........................... H04Q 7/20; H04B 17/00
(52) U.S. Cl. ................. 455/522; 455/67.13; 455/69; 455/561; 375/342; 370/342
(58) Field of Search .............................. 455/522, 464, 455/560–561, 13.4, 17, 456.5, 69, 67.11, 67.13; 370/330, 331, 318, 317, 342; 375/260, 267, 317, 342

(56) References Cited

U.S. PATENT DOCUMENTS 5,839,056 A * 11/1998 Hakkinen .................... 455/69
5,873,028 A * 2/1999 Nakano et al. ............... 455/69
6,108,374 A * 8/2000 Balachandran et al. ....... 455/69
6,385,462 B1 * 5/2002 Baum et al. ................. 455/522
6,407,993 B1   6/2002 Moulsley
6,510,189 B1 * 1/2003 Hiramatsu et al. .......... 455/464
6,650,905 B1 * 11/2003 Toskala et al. ............. 455/522

FOREIGN PATENT DOCUMENTS

| EP | 0940933 | 9/1999 |
| JP | 10056420 | 2/1998 |
| JP | 11308662 | 11/1999 |
| JP | 11355373 | 12/1999 |
| JP | 2000 031944 | 1/2000 |
| JP | 2000 091987 | 3/2000 |
| WO | 0004649 | 1/2000 |

* cited by examiner

Primary Examiner—David Hudspeth
Assistant Examiner—Kamran Afshar
(74) Attorney, Agent, or Firm—Stevens, Davis, Miller & Mosher, LLP (57) ABSTRACT

An SIR information extracting section 106 extracts SIR measured at a communication terminal from the received data, and a fluctuation amount calculating section 109 calculates a fluctuation amount of SIR between time at which the communication terminal has measured SIR and transmission starting time of DSCH data using a TPC command, and a. transmission system determining section 110 adds the SIR fluctuation amount calculated in the fluctuation amount calculating section 109 to the SIR measured at the communication terminal and estimates SIR of DSCH data so as to determine an optimal transmission system of DSCH data according to the estimated SIR.

4 Claims, 7 Drawing Sheets

BASE STATION APPARATUS AND RADIO COMMUNICATION METHOD

TECHNICAL FIELD

The present invention relates to a base station apparatus and a radio communication method used for high-speed data communication.

BACKGROUND ART

One example of a multiple access method of a digital radio communication system is CDMA (Code Division Multiple Access) system. 3GPP (3rd Generation Partnership Project) which is a standard association of the mobile radio communication system adopts, in its standardization, the CDMA system wherein a DSCH (Downlink Shared CHannel) used for high-speed data communication in a downlink (link from a base station to a communication terminal) is defined as one of the common channels shared by a plurality of communication terminals.

Since in each communication terminal, the DSCH is allocated to be used in a predetermined transmission unit (for example, each one frame), then it is expected to be utilized for high-speed packet communication, etc., on a downlink.

Figure 1:
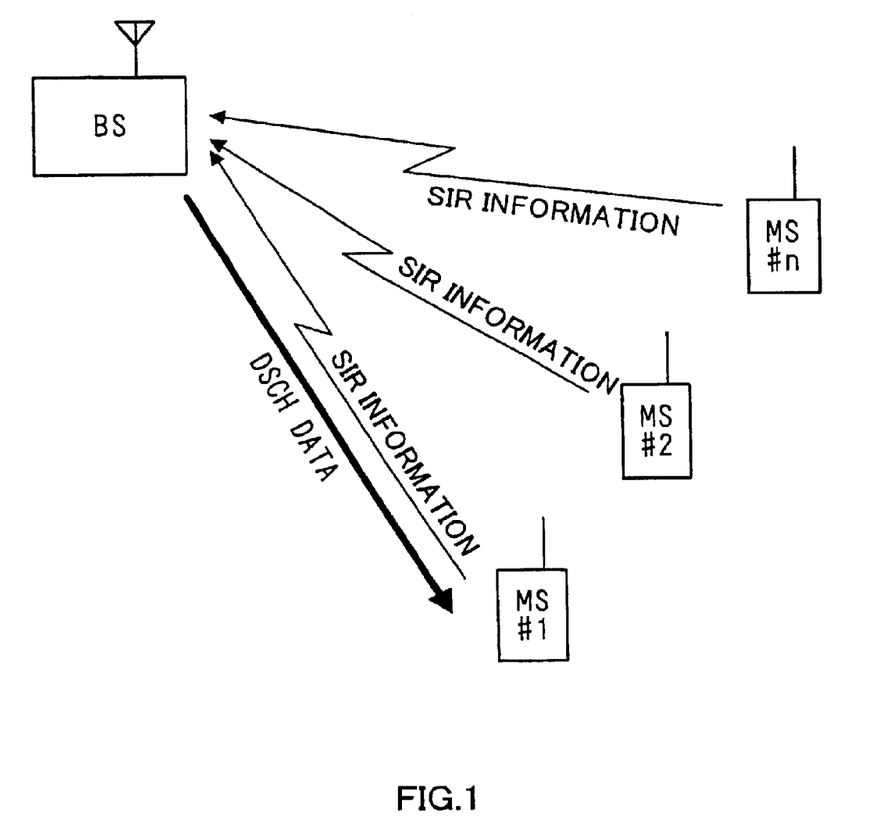
FIG. 1 is a conceptual diagram of a high-speed packet communication system using DSCH.

An explanation for a communication procedure of high-speed packet communication using DSCH channel is given below. FIG. 1 is a conceptual diagram of the high-speed packet communication system using DSCH and FIG. 2 is a diagram showing the relationship between a conventional communication procedure of the high-speed packet communication using DSCH and the receiving SIR at a communication terminal.

In high-speed packet communication using DSCH, a base station BS compares SIR (Signal to Interference Ratio) information notified by individual communication terminals MS#1 to MS#n as shown in FIG. 1 and assigns DSCH to a communication terminal which has the best channel condition (here, MS#1) so as to transmit DSCH data (namely, high-speed packet data).

Figure 2:
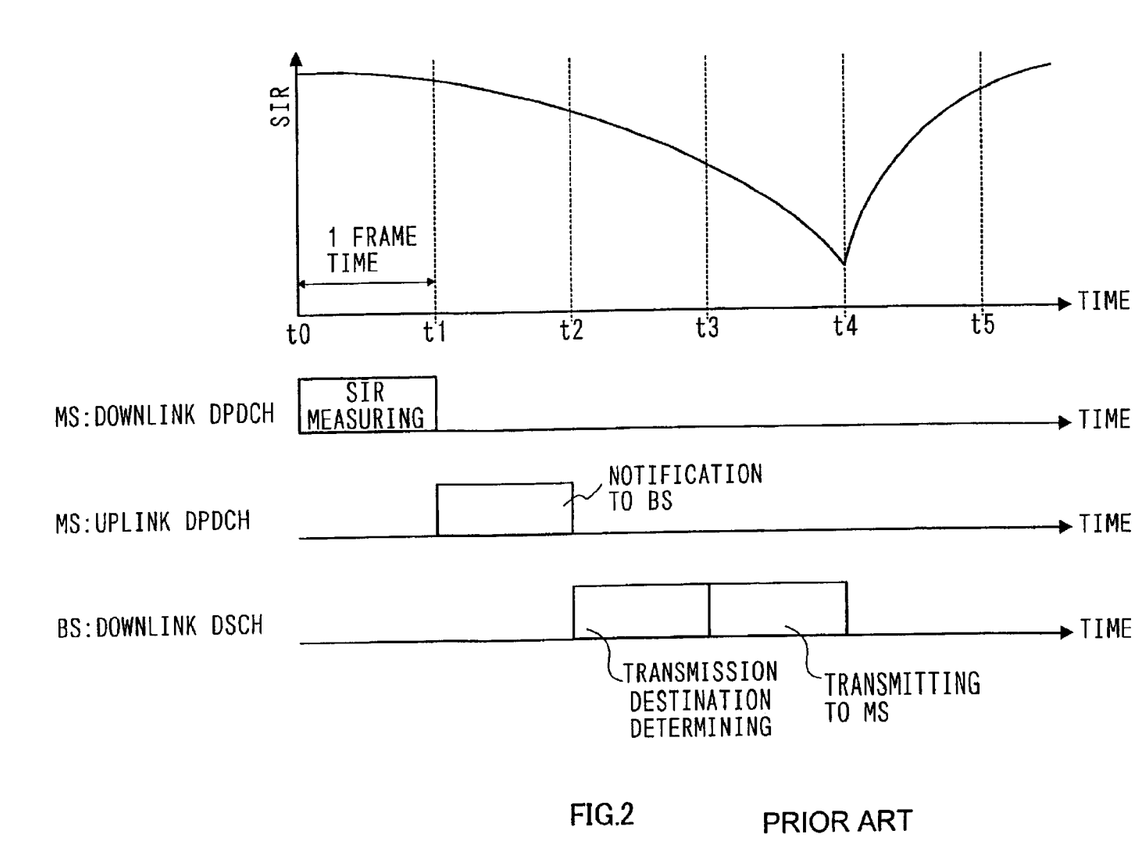
FIG. 2 is a diagram showing a relationship between a conventional communication procedure and receiving SIR at a communication terminal in high-speed packet communication using DSCH.

Further, FIG. 2 shows the communication procedure during the time of measurement of receiving SIRs at individual communication terminals up to transmission of DSCH data to the respective communication terminals. Specifically, during t0 to t1, the communication terminals MS#1 to MS#n measure SIR for one frame of the downlink DPDCH (Dedicated Physical Data CHannel). Each communication terminal executes the averaging of the SIRs measured in every slot of the DPDCH data over one frame.

At next frame (from t1 to t2), the communication terminals MS#1 to MS#n notifies the one frame average SIR to the base station BS using uplink DPDCH (link from a communication terminal to a base station).

At the third frame (from t2 to t3) the base station BS compares the average SIRs notified from the respective communication terminals and determines, as a destination of DSCH data transmission, a communication terminal which has the best channel condition, i.e., a communication terminal which has the largest SIR (here, MS#1). Moreover, the base station BS determines a modulating, and coding schemes in addition to transmitting power (hereinafter, they are referred to as "transmission system") as a transmission method of the DSCH data according to the SIR notified from the communication terminal assigned as a destination of DSCH data. In other words, the base station BS determines modulating and coding schemes in addition to transmitting power which were optimal for the channel condition during the past time t0 to t1 as the transmission system of the DSCH data. The optimal transmission system is determined in advance according to an SIR level.

At the last frame (from t3 to t4), the base station BS transmits the DSCH data using downlink DSCH to the communication terminal assigned as a transmission destination according to the determined transmission system.

However, when a high-speed packet communication is carried out according to the procedure shown in FIG. 2, there will be two frames period (from t1 to t3) between the first frame (from t0 to t1) at which the respective communication terminals measure SIRs of DPDCH data and the last frame (from t3 to t4) at which the base station BS transmits DSCH data. Therefore, within this two frames period (from t1 to t3), the propagation environment mostly will be changed, and hence, it is possible that the SIR of DSCH data received by a communication terminal is greatly deteriorated. That is to say, at a communication terminal, there is a possibility that SIR of DSCH received during t3 to t4 is greatly deteriorated in comparison with the SIR of DPDCH data received during t0 to t1.

Since the base station BS has determined the modulating, and coding schemes as well as the transmitting power as the transmission system of DSCH data which are optimal for SIR measured from t1 to t2 and if SIR notified from a communication terminal is different from the SIR of DSCH data, then, the transmission system of DSCH data is not always optimal. Therefore, there is a possibility that the quality of DSCH data is deteriorated.

DISCLOSURE OF THE INVENTION

It is an object of the present invention to provide a base station apparatus and a radio communication method which are capable of transmitting DSCH data according to optimal transmission system according to the downlink channel condition and preventing receiving quality of the DSCH data from being deteriorated.

The inventors of the present invention have paid attention to a TPC (Transmit Power Control) command which increase/decrease the transmission power and directs the change in the transmission power of the downlink DPDCH data to a base station during the time at which the communication terminal has measured a downlink channel quality and the transmission starting time of which DSCH data being transmitted from a communication terminal to the base station for every slot using an uplink DPCCH (Dedicated Physical Control CHannel). The inventors devised the present invention in which the observing and measuring of the TPC commands for plural slots found out that the current downlink channel condition can be estimated from a past channel condition.

Therefore, in order to achieve the above-mentioned object, in the present invention, a fluctuation of the channel condition between the time at which a communication terminal has measured the link quality and the transmission starting time of DSCH data are added to the channel condition notified from the communication terminal, so that a channel condition at the transmission starting time of DSCH data is estimated, and the DSCH data are transmitted by an optimal transmission system according to the estimated link condition.

In other words, in the present invention, a modulating and coding schemes and a transmitting power used to transmit DSCH data are determined according to the following procedure.

First communication terminals measure SIRs of DPDCH data on the downlink at a certain frame and notify the measured SIRs to the base station at next frame. In addition, while notifying the SIRs to the base station the communication terminals transmit to the base station TPC commands for directing the increase/decrease of the transmitting power within each slot of DPDCH data using DPCCH.

Then, at the next frame, the base station determines a communication terminal to be a transmission destination of DSCH data according to the SIRs notified from the communication terminals. In addition, while the base station is determining the communication terminal to be the transmission destination of DSCH data, the communication terminals transmit to the base station TPC commands for directing increase/decrease of the transmitting power per slot of DPDCH data using DPCCH.

Next, since the TPC commands for 2 frames are transmitted to the base station, the base station calculates an SIR fluctuation amount for 2 frames using the TPC commands, and adds the SIR fluctuation amount to the SIR notified from the communication terminal so as to estimate the SIR at the time at which the DSCH data are received by the communication terminal. Finally, The base station determines the transmission system of the DSCH data based on the estimated SIR. Accordingly, the DSCH data are transmitted to the transmission terminal using the modulating and coding schemes and transmitting power which are optimal for the channel condition at the DSCH data transmitting time so that the quality of the DSCH data can be prevented from being deteriorated.

BEST MODE FOR CARRYING OUT THE INVENTION

Referring to the attached drawings, a detailed description of one embodiment of the present invention is given below. However, the following explanation is restricted to the case where DSCH is used as a common channel shared by a plurality of communication terminals, but the present invention is not limited to this restriction and this embodiment is applicable to the case where any channel excluding DSCH can be used as a common channel.

Figure 3:
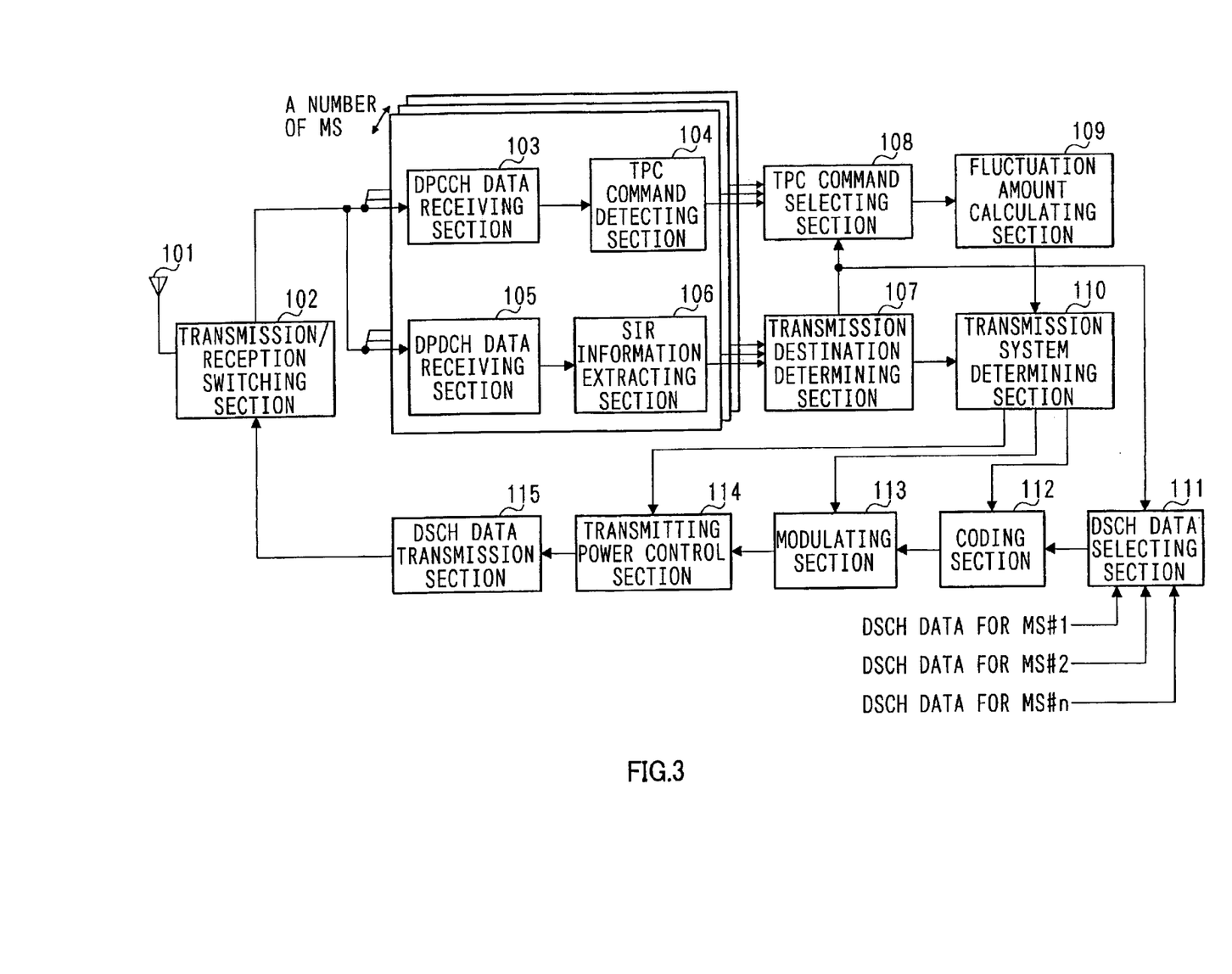
FIG. 3 is a block diagram of a main section illustrating a schematic structure of a base station apparatus according to one embodiment of the present invention.

FIG. 3 is a block diagram of a main section illustrating a schematic structure of a base station apparatus according to one embodiment of the present invention. In the base station apparatus shown in FIG. 3, a transmission/reception switching section 102 outputs data received via an antenna 101 to each DPCCH data receiving section 103 and to each DPDCH data receiving section 105, and outputs DSCH data received from a DSCH data transmission section 115 to the antenna 101.

Each DPCCH data receiving section 103 executes a predetermined radio process for the received data and despreads them with a spreading code used for DPCCH data so as to fetch DPCCH data from the received data. Moreover, the fetched DPCCH data are subjected to a predetermined demodulating process in each DPCCH data receiving section 103 and outputted to each TPC command detecting section 104 which in turn detects a TPC command stored in each slot of the DPCCH data and outputs the TPC commands to a TPC command selecting section 108. The TPC commands outputted to the TPC command selecting section 108 are stored for each communication terminal for predetermined frame part (here, two frames) in the TPC command selecting section 108.

Each DPDCH data receiving section 105 executes a predetermined radio process for the received data and despreads the received data with a spreading code used for DPDCH data so as to fetch DPDCH data from the received data. The fetched DPDCH data are subjected to a predetermined demodulating process in each DPDCH data receiving section 105 and outputted to each SIR information extracting section 106. Each SIR information extracting section 106 extracts from the DPDCH data the SIR information notified from each communication terminal MS#1 to MS#n and outputs the SIR information to a transmission destination determining section 107.

The DPCCH data receiving section 103, the TPC command detecting section 104, the DPDCH data receiving section 105 and the SIR information detecting section 106 are provided for each communication terminal.

The transmission destination determining section 107 determines a transmission destination of the DSCH data according to the SIRs information notified from the respective communication terminals and outputs a signal representing the determined destination communication terminal to both TPC command selecting section 108 and DSCH data selecting section 111. In addition, the transmission destination determining section 107 selects SIR notified from the communication terminal which is determined as the transmission destination of the DSCH data among the SIRs notified from other communication terminals and outputs it to a transmission system determining section 110.

The TPC command selecting section 108 selects TPC commands transmitted from the communication terminal which is determined as the transmission destination of DSCH data among TPC commands of other communication terminals and outputs the selected TPC commands to a fluctuation amount calculating section 109. Indeed, the TPC commands during the two frames transmitted from the communication terminal which determined as a transmission destination of the DSCH data are outputted to the fluctuation amount calculating section 109.

The fluctuation amount calculating section 109 calculates an SIR fluctuation amount during the two frames of the communication terminal which determined as the transmission destination of the DSCH data, using the TPC commands outputted from the TPC command selecting section 108. In other words, the fluctuation amount calculating section 109 adds TPC commands of the two frames used to increase/decrease transmitting power of a downlink DPDCH data so as to calculate the SIR fluctuation amount during the two frames. The calculated SIR fluctuation amount is outputted to the transmission system determining section 110.

The transmission system determining section 110 adds the SIR fluctuation amount outputted from the fluctuation amount calculating section 109 to SIR outputted from the transmission destination determining section 107 and determines the optimal transmission system for SIR when the DSCH data is actually received by the communication terminal determined as the transmission destination of the DSCH data. That is, the transmission system determining section 110 adds the channel condition with the fluctuation in the two frames part shown by the TPC commands to the past downlink channel condition and estimates the current downlink channel condition so as to determine the optimal modulating and coding schemes as well as the optimum transmitting power for the estimated current channel condition. A signal indicating the determined modulating scheme is outputted to a modulating section 113, a signal indicating the determined coding scheme is outputted to a coding section 112, and a signal indicating the determined transmitting power is outputted to a transmitting power control section 114.

The DSCH data selecting section 111 selects DSCH data of the communication terminal determined as the transmission destination of DSCH data from the DSCH data of the communication terminals MS#1 to MS#n to be outputted to the coding section 112.

The coding section 112 encodes the DSCH data using the coding scheme determined in the transmission system determining section 110 and outputs it to the modulating section 113. The modulating section 113 modulates the encoded DSCH data using the modulating scheme determined in the transmission system determining section 110 and outputs it to the transmitting power control section 114. The transmitting power control section 114 controls the transmitting power of the modulated DSCH data to match the transmitting power determined in the transmission system determining section 110 and outputs the DSCH data of which transmitting power has been controlled to the DSCH data transmission section 115.

The DSCH data transmission section 115 executes a predetermined spreading and radio processes for the DSCH data of which transmitting power has been controlled and outputs the DSCH data to the transmission/reception switching section 102.

Figure 4:
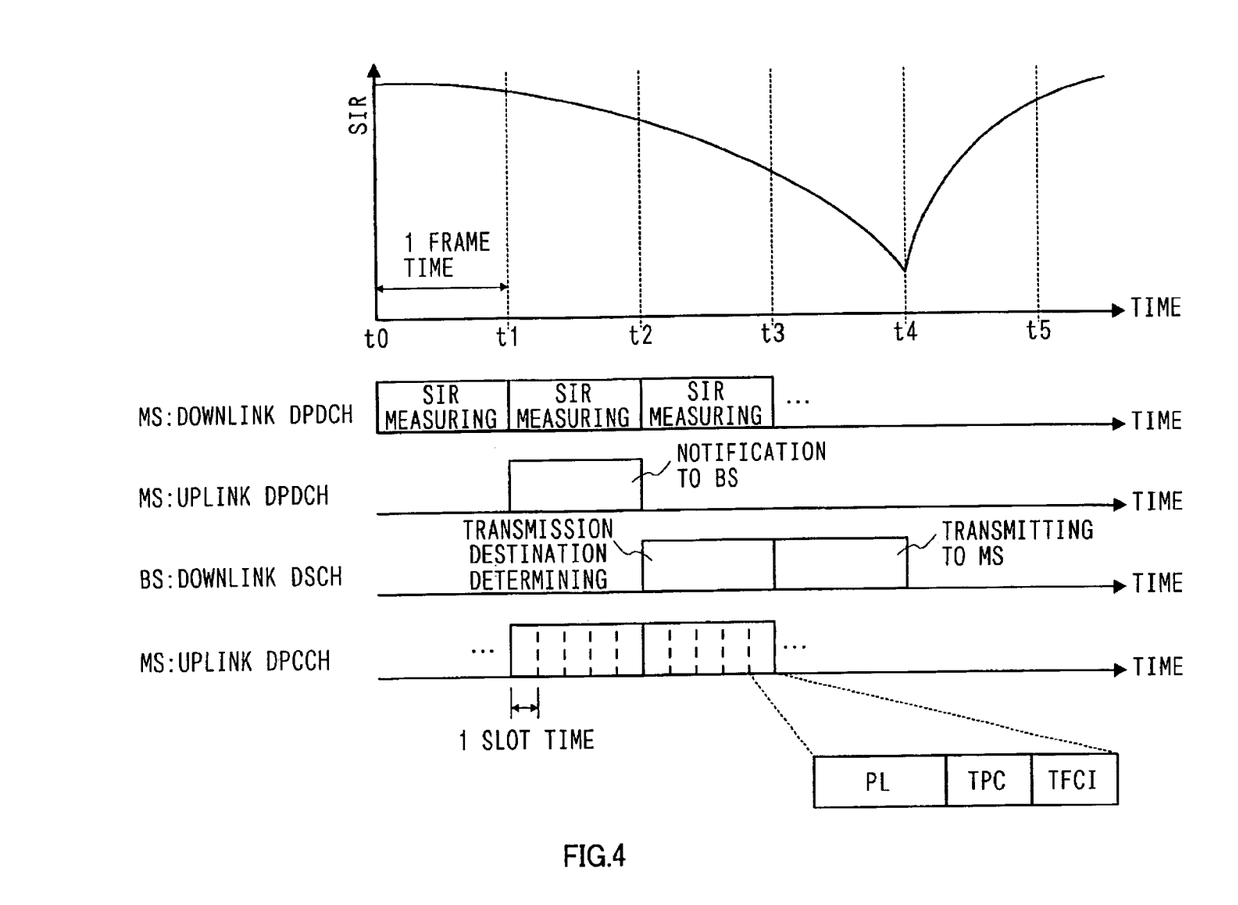
FIG. 4 is a diagram showing a relationship between the communication procedure and the communication terminal according to one embodiment of the present invention in the high-speed packet communication using DSCH.

An operational explanation of the base station apparatus having the above structure is given below. FIG. 4 of the present invention is a diagram showing a relationship between a communication procedure and the receiving SIR at the communication terminal in high-speed packet communication using DSCH.

The following explanation exemplifies the case where one frame of a DPCCH signal includes 5 slots, but the present invention is not limited to this and the embodiment can be carried out regardless of the number of slots included in one frame.

First during t0 to t1, the respective communication terminals MS#1 to MS#n measure the one frame SIRs of the downlink DPDCH data. Each communication terminal averages the one frame SIRS measured in each slot of DPDCH data.

Then, in each slot of all frames of DPDCH data, each communication terminal compares the measured SIR with a predetermined desirable SIR. When the measured SIR is smaller than the desirable SIR, each communication terminal generates a TPC command requesting the base station to increase a transmitting power of the DPDCH data and when the measured SIR is larger than the desirable SIR, each communication terminal generates a TPC command requesting the base station to decrease the transmitting power of the DPDCH data. Specifically, when the measured SIR is smaller than the desirable SIR, each communication terminal generates a TPC command representing +1 dB, and when the measured SIR is larger than the desirable SIR, each communication terminal generates a TPC command representing −1 dB. In other words, when the channel condition is bad and the receiving quality is lower than a desirable quality, a direction for increasing the transmitting power of DPDCH data is notified to the base station and when the channel condition is good and the receiving quality is larger than the desirable quality, a direction for decreasing the transmitting power of DPDCH data is notified to the base station.

The generated TPC commands are allocated in the respective slots of the DPCCH data and are transmitted to the base station BS using the uplink DPCCH. As shown in FIG. 4, the one slot of DPCCH data is composed of a pilot portion (PL), a TPC command portion (TPC) and a TFCI portion (Transport Format Combination Indicator).

At the base station, the successively received TPC commands are detected from the DPCCH data by the TPC command detecting sections 104 and are outputted to the TPC command selecting section 108.

At the next frame (from t1 to t2), each communication terminal notifies the base station of the one frame SIR using the uplink DPDCH. The SIR information notified to the base station is extracted from the DPDCH data by the SIR information extracting section 106 to be outputted to the transmission destination determining section 107.

In addition, at time t1 where the notification of SIRs using the uplink DPDCH is started, at the base station the TPC command selecting section 108 starts to store the TPC commands outputted from the respective TPC command detecting section 104. The storage of the TPC commands continues until t3 at which the transmission of DSCH data is started. In other words, the TPC commands of two frames (i.e., 10 slots) from t1 to t3 are successively stored in the TPC command selecting section 108.

At the third frame (from t2 to t3), a transmission destination and a transmission system of the DSCH data are determined. Firstly, the transmission destination determining section 107 compares SIRs notified from the respective communication terminals and determines a communication terminal which has the best downlink channel condition measured during t0 to t1 (here, MS#1) as the transmission destination of the DSCH data. Then, a signal representing MS#1 is outputted to both TPC command selecting section 108 and the DSCH data selecting section 111. The DSCH data selecting section 111 selects the DSCH data of MS#1 among the DSCH data of MS#1 to MS#n according to the signal representing MS#1 and outputs the selected DSCH data to the coding section 112.

Furthermore, at t3 the transmission destination determining section 107 selects SIR notified by the communication terminal MS#1 from the SIRs notified by the respective communication terminals and outputs the selected SIR to the transmission system determining section 110.

When the signal representing the communication terminal MS#1 is outputted from the transmission destination determining section 107 at t3, the TPC command selecting section 108 selects the TPC commands transmitted by the communication terminal MS#1 among the stored TPC commands and outputs them to the fluctuation amount calculating section 109. In other words, the two frames TPC commands (i.e., the 10 slots) notified from the communication terminal MS#1 during t1 to t3 are outputted from the TPC selecting section 108 to the fluctuation amount calculating section 109.

The fluctuation amount calculating section 109 adds all the two frames TPC commands outputted from the TPC selecting section 108 and calculates an SIR fluctuation amount in the two frames from t1 at which the communication terminal MS#1 starts notification of SIR up to t3 at which the base station starts to transmit DSCH data so as to output the SIR fluctuation amount to the transmission system determining section 110. More concretely, the SIR fluctuation amount is calculated in the following manner.

Consider two frames as an example, when the TPC commands of 6 slots are TPC commands representing +1 dB and the TPC commands of the other 4 slots are TPC commands representing −1 dB, a fluctuation amount of SIR for the two frames is calculated as −2 dB. Indeed, the downlink channel condition at t3 is deteriorated by 2 dB comparing to the channel condition notified at t1.

Moreover, when the TPC commands of 4 slots are TPC commands representing +1 dB and the TPC commands of the other 6 slots are TPC commands representing −1 dB, a fluctuation amount of SIR for the two frames is calculated as +2 dB. That is, the downlink channel condition at t3 is improved by 2 dB comparing to the channel condition notified at t1.

Accordingly, the fluctuation amount calculating section 109 can calculate an SIR fluctuation amount for 2 frames using TPC commands.

The transmission system determining section 110 firstly selects a modulating and coding schemes as well as a transmitting power of DSCH data according to the conventional method. The transmission system determining section 110 firstly selects an optimal SIR transmission system which has been notified from the communication terminal MS#1 determined as a transmission destination of DSCH data during t1 to t2. That is to say, the transmission system determining section 110 firstly selects a modulating and coding schemes and a transmitting power which were optimal for the link condition during the past time t0 to t1. The optimal SIR transmission systems are determined in advance according to SIR levels, similar to the conventional art.

The transmission system determining section 110 determines an optimal transmission system according to the current channel condition. Specifically, modulating and coding schemes in addition to transmitting power of DSCH data are determined in the following manner.

The transmission system determining section 110 adds the SIR fluctuation amount calculated by the fluctuation amount calculating section 109 to the transmitting power optimal for the channel condition during the past time t0 to t1 so as to obtain a transmitting power optimal for the current channel condition. Precisely, for example when the SIR fluctuation amount calculated by the fluctuation amount calculating section 109 is −2 dB and the downlink channel condition at t3 is deteriorated by 2 dB comparing to the link quality notified at t1, the transmission system determining section 110 determines a value which is 2 dB larger than the transmitting power optimal for the channel condition during the past time t0 to t1 as a transmitting power of DSCH data.

In such a manner, according to the present embodiment, since the transmitting power of DSCH data is controlled to an optimal transmitting power based on an estimated current channel condition and even if the channel condition fluctuates between the measuring time of the channel condition and the time at which the transmission of DSCH data starts, the receiving quality of DSCH data at a communication terminal can be kept in a desirable quality.

Figure 5:
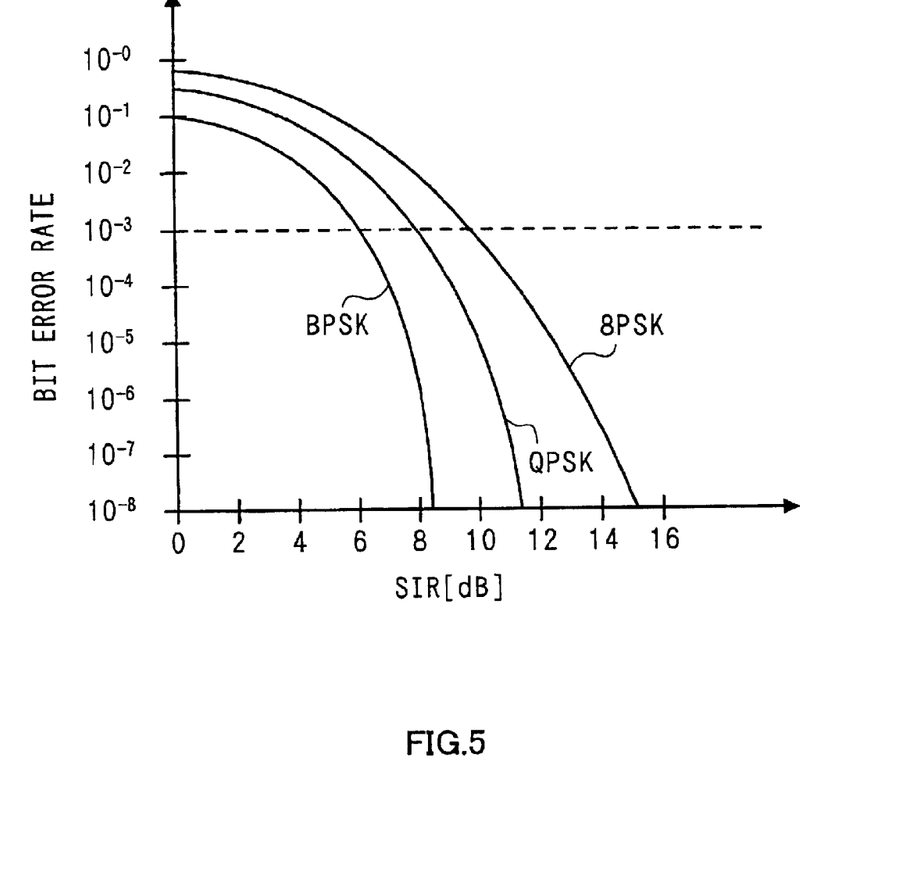
FIG. 5 is a graph for explaining a method of determining a modulating scheme in the base station apparatus according to one embodiment of the present invention.
Figure 6:
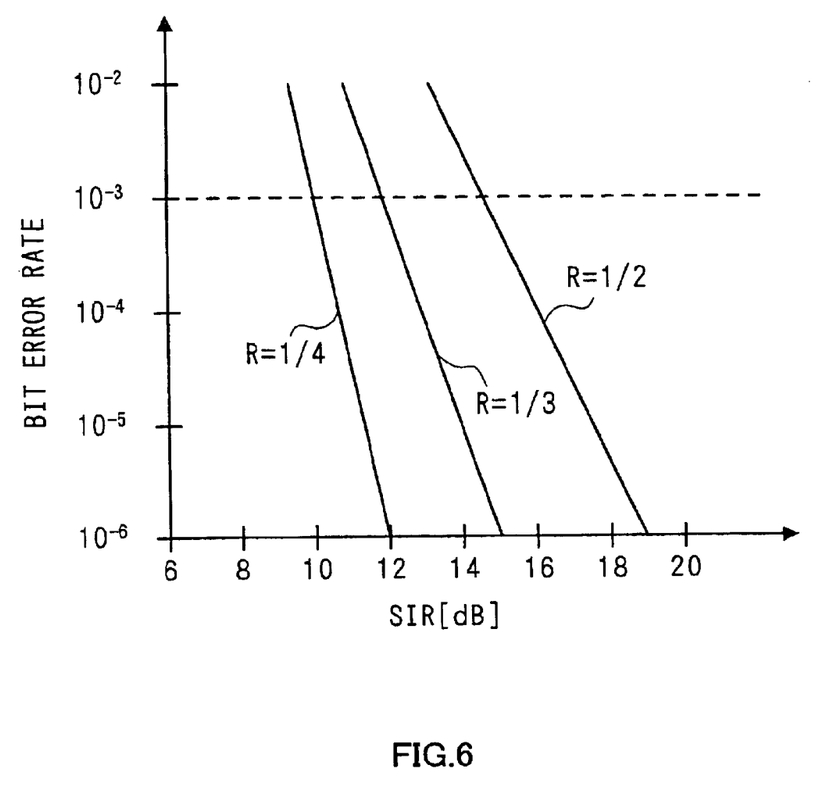
FIG. 6 is a graph for explaining a method of determining a coding scheme in the base station apparatus according to one embodiment of the present invention.

Furthermore, the transmission system determining section 110 adds SIR fluctuation amount calculated by the fluctuation amount calculating section 109 to the modulating and coding schemes which were optimal for the link condition during the past time t0 to t1 so as to determine the modulating and coding schemes which are optimal for a current channel condition. The modulating and coding schemes which are optimal for the current channel condition are determined in the following manner. FIG. 5 is a graph for explaining a method of determining the modulating scheme at the base station apparatus according to one embodiment of the present invention. FIG. 6 is a graph for explaining a method of determining the coding scheme at the base station apparatus according to one embodiment of the present invention.

First, an explanation of the method of determining the modulating scheme is given. FIG. 5 is a graph shows the general relationship between SIR and bit error rate for different modulating schemes. Accordingly, when the modulating scheme which was optimal for the channel condition during the past time t0 to t1 is QPSK and the SIR fluctuation amount calculated by the fluctuation amount calculating section 109 is −2 dB, for instance, the transmission system determining section 110 determines BPSK which is the modulating scheme corresponding to SIR which is 2 dB smaller than QPSK at a bit error rate of $10^{-3}$ as the modulating scheme of DSCH data. At this time, BPSK can acquire the same communication quality as that of QPSK (namely, the bit error rate of $10^{-3}$). That is, when the current channel condition is deteriorated further than the past channel condition, a modulating scheme with fewer value, which can be expressed by one symbol, than the optimal modulating scheme for the past channel condition is determined as the modulating scheme of DSCH data.

According to the present embodiment, since DSCH data are encoded by the optimal coding scheme based on an estimated current channel condition and even if the channel condition fluctuates between the channel condition measured time and the DSCH data transmission starting time, an error rate of DSCH data can be kept in a desirable error rate.

Next an explanation of the method of determining the coding scheme is given below. FIG. 6 is a graph shows the general relationship between SIR and bit error rate at different coding rates, R. Therefore, when the optimal coding rate R for the channel condition during the past time t0 to t1 was $1/3$ and the SIR fluctuation amount calculated by the fluctuation amount calculating section 109 was −2 dB, for instance, the transmission system determining section 110 determines the coding rate R=$1/4$ corresponding to SIR which is 2 dB smaller than the coding rate R=$1/3$ as the coding rate of DSCH data at the bit error rate of $10^{-3}$. At this time, the coding rate R=$1/4$ can acquire the same communication quality as that of the coding rate R=$1/3$ (namely, the bit error rate of $10^{-3}$). It is to say, when the current channel condition gets worse compared with the past channel condition, a coding scheme with higher coding rate than that of the coding scheme optimal for the past link condition is determined as the coding scheme of DSCH data.

According to this embodiment, since DSCH data is modulated by the optimal modulating scheme based on an estimated current channel condition and even if the channel condition fluctuates between the channel condition measured time and the DSCH data transmission starting time, the error rate of DSCH data can be kept in a desirable error rate.

The above exemplification described the case when the required value of the bit error rate of DSCH data is $10^{-3}$, and therefore, the required bit error rate value can be determined arbitrarily in radio communication systems to which this embodiment is applied. Moreover, the bit error rate characteristics shown in FIGS. 5 and 6 are just an example, and hence, the modulating and coding schemes are determined suitably according to the bit error rate characteristics in each radio communication system.

The signals representing the determined coding scheme, modulating scheme and transmitting power are outputted respectively to the coding section 112, the modulating section 113 and the transmitting power control section 114.

The coding section 112 encodes the DSCH data for MS#1 using the coding scheme determined in the transmission system determining section 110 and outputs the DSCH data to the modulating section 113. Moreover, the modulating section 113 modulates the coded DSCH data using the modulating scheme determined in the transmission system determining section 110 and outputs them to the transmitting power control section 114.

Then, the transmitting power control section 114 controls the modulated DSCH data so that the DSCH data has the transmitting power determined in the transmission system determining section 110 and outputs the DSCH data to the DSCH data transmission section 115 to be transmitted to the communication terminal MS#1.

As described below, the transmission system determining section 110 may determine the optimal transmission system according to a current channel condition. That is, the transmission system determining section 110 firstly adds the SIR fluctuation amount output from the fluctuation amount calculating section 109 to the SIR output from the transmission destination determining section 107 and estimates SIR when the communication terminal MS#1 actually receives DSCH, i.e., the transmission system determining section 110 adds the SIR fluctuation amount during the period from t1 to t3 to the SIR notified at the past time t1 and estimates a downlink channel condition at the current time t3.

Thereafter, the transmission destination determining section 107 selects a transmission system optimal for the estimated SIR. That is, the transmission system determining section 110 selects a modulating and coding schemes as well as a transmitting power which are optimal for the estimated SIR. The optimal transmission system for SIR is previously determined based on an SIR level, similar to the conventional art.

According to this embodiment, as a TPC command is measured by estimating a current downlink channel condition from a past downlink channel condition, DSCH data can be transmitted using the optimal transmission system according to the current channel condition.

In addition, according to this embodiment, since fluctuation of the channel condition is detected by observing the TPC command notified in an earlier cycle than the notification cycle of a channel condition, the current channel condition present in a cycle earlier than the notification cycle of a channel condition can be correctly estimated.

Furthermore, according to this embodiment, since the TPC command used not only for controlling the transmitting power of DPDCH data but also for detecting fluctuation of the channel condition, it is not necessary for a communication terminal to notify of information used for detection the fluctuation of the channel condition. Such unnecessary notification makes it possible to improve the using efficiency of the channel and to simplify the communication system structure. Moreover, since a TPC command has been already transmitted in an existing DPCCH, it is not necessary to additionally provide new information used for detection the fluctuation of the channel condition. Accordingly, it is not necessary to additionally provide a receiving device to detect the fluctuation information of the channel condition in the base station apparatus, and hence, an increase in the scale of the apparatus can be reduced. Moreover, it is not necessary to construct a communication system provided with information for detecting a fluctuation of the channel condition, and because the fluctuation of the channel condition can be detected using the current communication system, data of common channel can be transmitted using the optimal transmission system according to the current channel condition without new added cost of the communication system construction.

Further, according to this embodiment, since the modulating and coding schemes and the transmitting power are combined together to be changed according to a fluctuation of the channel condition, an optimal transmission system can be determined according to various channel conditions more securely than the case when changing one of the modulating and coding schemes and transmitting power.

Figure 7:
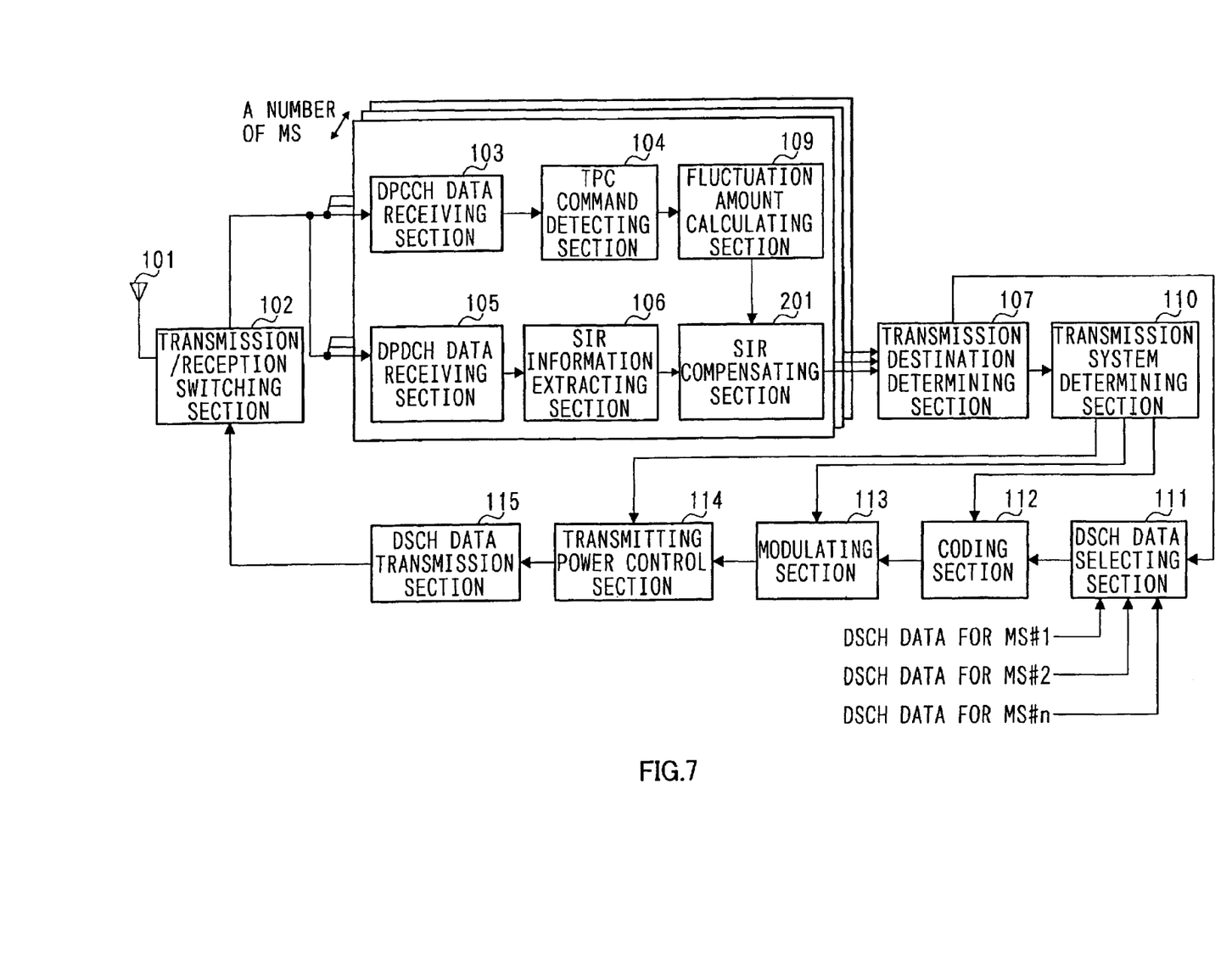
FIG. 7 is a block diagram of a main section illustrating another schematic structure of the base station apparatus according to one embodiment of the present invention.

The configuration of the base station apparatus shown in FIG. 7 can be used instead of the configuration shown in FIG. 3 according to this embodiment. FIG. 7 is a block diagram of a main section showing another schematic structure of the base station apparatus according to one embodiment of the present invention. In the structure shown in FIG. 7, similar reference numerals are given to the similar parts of those in FIG. 3, and their detailed description thereof is omitted.

In FIG. 3, the fluctuation amount calculating section 109 calculates an SIR fluctuation amount using a TPC command selected by the TPC command selecting section 108. However, in FIG. 7, the fluctuation amount calculating section 109 and an SIR compensating section 201 are provided for each communication terminal so that an SIR fluctuation amount is calculated for each communication terminal and each SIR notified from each communication terminal is compensated for.

In other words, the fluctuation amount calculating section 109 calculates an SIR fluctuation amount using a TPC command outputted from the TPC command detecting section 104 similar to the above manner. The calculated SIR fluctuation amount is outputted to the SIR compensating section 201. The SIR compensating section 201 adds the SIR fluctuation amount to SIR information outputted from the SIR information extracting section 106 so as to compensate the SIR notified from a communication terminal. The compensated SIR is then outputted to the transmission destination determining section 107.

The transmission destination determining section 107 determines a transmission destination of DSCH data according to the respective compensated SIRs. The compensated SIRs are used so that a communication terminal which has the best current downlink channel condition is determined as the transmission destination of DSCH data. The transmission destination determining section 107 outputs a signal representing the determined communication terminal to the DSCH data selecting section 111 and selects the SIR corresponding to the communication terminal which determined as the transmission destination of DSCH data among the compensated SIRs and outputs the selected SIR to the transmission system determining section 110.

The transmission system determining section 110 determines a transmission system optimal for the compensated SIR outputted from the transmission destination determining section 107. The compensated SIR is used so that the transmission system optimal for current downlink channel condition is determined. This section is similar to that of FIG. 3.

Accordingly, referring to the structure shown in FIG. 7, since the transmission destination is determined according to the compensated SIR, i.e., the current channel condition, the optimal transmission destination can be selected more securely than that of the structure shown in FIG. 3 wherein the transmission destination is determined according to the SIRs notified from the respective communication terminals.

The embodiment exemplified the SIR as a value representing the communication quality, but the present invention is not limited to this representation and can be carried out by using any value as long as it represents the communication quality.

Further, in the embodiment, the modulating and coding schemes as well as the transmitting power of DSCH data are determined per frame, but they can be determined also per slot.

Further, the embodiment can be applied to a communication system where DSCH data are re-transmitted as long as the DSCH data received erroneously. That is, the modulating and coding schemes and the transmitting power can be determined for the DSCH data to be re-transmitted by the same method described in the embodiment. Moreover, the modulating and coding schemes and the transmitting power of DSCH data can be determined also per slot.

In addition, the embodiment exemplified the radio communication system for executing high-speed data communication of a downlink using DSCH, but the invention is not limited to this. The present embodiment can be applied to all radio communication systems in which a base station determines allocation of a common channel based on a value representing the communication quality transmitted from each communication terminal so that high-speed data communication of a downlink is executed.

Further, the embodiment explained the case where all the modulating and coding schemes and the transmitting power are changed, but the invention is not limited to this, and one or two of the modulating and coding schemes and the transmitting power can be changed.

As explained above, according to the present invention, since DSCH data can be transmitted by the optimal transmission system and transmitting power according to the downlink channel condition, it is possible to prevent deterioration of the receiving quality of the DSCH data.

This specification is based on Japanese Patent Application No. 2000-201232 filed on Jul. 3, 2000. The contents of this patent application are all included in this specification.

INDUSTRIAL APPLICABILITY

The present invention can be used in a mobile communication system for executing high-speed data communication on a downlink.

What is claimed is:

1. A base station apparatus, comprising:
a capturer that captures channel quality information about a downlink channel quality measured at a communication terminal;
a receiver that receives a TPC command from the communication terminal;
a calculator that calculates an amount of fluctuation in the downlink channel quality using the TPC command; and
a determiner that compensates the channel quality information with reference to the amount of fluctuation and determines a modulating scheme and a coding scheme for transmission of data to the communication terminal according to the compensated channel quality information.

2. The base station apparatus according to claim 1, wherein:
after the capturer captures the channel quality information, the calculator adds a plurality of TPC commands received by the receiver to produce a TPC added result and assigns the TPC added result as the amount of fluctuation; and
the determiner adds the amount of fluctuation to the channel quality information to compensate the channel quality information.

3. The base station apparatus according to claim 1, further comprising:
a selector that selects from a plurality of communication terminals a transmission destination communication terminal for a DSCH shared by said plurality of communication terminals, wherein:
the capturer captures a plurality of channel quality information corresponding to said plurality of communication terminals respectively,
the selector selects the transmission destination communication terminal of the DSCH with reference to the plurality of channel quality information,
the calculator calculates an amount of fluctuation of the DSCH with reference to a TPC command transmitted from the transmission destination communication terminal of the DSCH, and
the determiner compensates channel quality information corresponding to the transmission destination communication terminal of the DSCH with reference to the amount of fluctuation of the DSCH and determines the modulating scheme and the coding scheme for the DSCH according to the compensated channel quality information for the transmission destination communication terminal of the DSCH.

4. A radio communication method, comprising:
capturing channel quality information about a downlink channel quality measured at a communication terminal;
receiving a TPC command from the communication terminal;
calculating an amount of fluctuation in the downlink channel quality with reference to the TPC command;
compensating the channel quality information with reference to the amount of fluctuation; and
determining a modulating scheme and a coding scheme for transmission of data to the communication terminal according to the compensated channel quality information.

* * * * *